United States Patent
Tsai

(10) Patent No.: US 6,481,060 B1
(45) Date of Patent: Nov. 19, 2002

(54) MULTI-PURPOSE CAP CLIP

(76) Inventor: Yu-Chi Tsai, No. 24-2, Lane 134, Sec. 2, Chung-Hsiao E. Road, Taipei (TW)

( * ) Notice: Subject to any disclaimer, the term of this patent is extended or adjusted under 35 U.S.C. 154(b) by 0 days.

(21) Appl. No.: 09/880,232

(22) Filed: Jun. 12, 2001

(51) Int. Cl.[7] .............................................. A44B 21/00
(52) U.S. Cl. ............................ 24/3.12; 24/3.1; 24/326; 24/336; 2/10; 2/195.1; 2/209.12; 224/249; 224/666
(58) Field of Search ................... 24/3.12, 3.1, DIG. 28, 24/DIG. 8, DIG. 29, 541, 546, 326; 224/666, 249, 269; 2/195.1, 195.4, 10, 209.12, 209.13, 209.14

(56) References Cited

U.S. PATENT DOCUMENTS

| | | | | |
|---|---|---|---|---|
| 4,833,751 A | * | 5/1989 | Iwase et al. | 15/190 |
| 4,876,771 A | * | 10/1989 | Givati | 211/119.13 |
| 5,066,154 A | * | 11/1991 | Renaud | 24/10 R |
| 5,074,508 A | * | 12/1991 | Powers | 211/31 |
| 5,199,780 A | * | 4/1993 | Ekman | 362/10 |
| 5,247,706 A | * | 9/1993 | Mark | 2/13 |
| 5,312,029 A | * | 5/1994 | Tuber | 224/241 |
| 5,412,812 A | * | 5/1995 | Gatchalian | 2/10 |
| 5,687,420 A | * | 11/1997 | Chong | 2/10 |
| 5,689,827 A | * | 11/1997 | Ryder | 2/10 |
| 5,778,448 A | * | 7/1998 | Maher | 2/10 |
| 5,826,271 A | * | 10/1998 | Garret | 2/10 |
| 5,881,391 A | * | 3/1999 | Mullaney | 116/173 |
| 5,890,638 A | * | 4/1999 | Woloshen | 224/191 |
| 5,930,834 A | * | 8/1999 | Toovey | 2/10 |
| 5,933,922 A | * | 8/1999 | Ochsman | 24/3.11 |
| 5,987,640 A | * | 11/1999 | Ryder | 2/10 |
| 6,065,563 A | * | 5/2000 | Stowers | 181/131 |
| 6,185,748 B1 | * | 2/2001 | DeChambeau | 2/195.1 |
| 6,223,910 B1 | * | 5/2001 | Levin et al. | 211/113 |
| 6,233,788 B1 | * | 5/2001 | Choy et al. | 224/197 |
| 6,247,205 B1 | * | 6/2001 | Damadian et al. | 2/10 |
| 6,275,992 B1 | * | 8/2001 | Bondy | 2/10 |
| 6,357,642 B1 | * | 3/2002 | Marchessault et al. | 2/209.13 |

* cited by examiner

Primary Examiner—Robert J. Sandy
Assistant Examiner—André L. Jackson
(74) Attorney, Agent, or Firm—Pro-Techtor International Services

(57) ABSTRACT

A multi-purpose cap clip, comprising a clip unit, a holding device, and an accessory object. The clip unit has a fixing plate and two clasping plates to two sides of the fixing plate, with the fixing plate and the two clasping plates clasping a brim of a cap. The accessory object has a holding element which fits on the holding device and is held thereby. After assembly of the structural parts, the clip unit fastens the accessory object on the brim of the cap.

4 Claims, 6 Drawing Sheets

MULTI-PURPOSE CAP CLIP

BACKGROUND OF THE INVENTION

1. Field of the Invention

The present invention relates to a multi-purpose cap clip, particularly to a multi-purpose cap clip for fastening an accessory object to a cap worn by a person.

2. Description of Related Art

Caps are often used clothing articles worn outdoors to provide protection against the sun. For other functions, accessory objects supplement caps, e.g. sunglasses for protecting the eyes against the sun. At events, for propaganda purposes, caps are distributed to participants, carrying certain imprinted patterns or small flags or other decorative objects to be well seen.

These examples for accessory objects on caps mostly require using dedicated special caps with the accessory objects fixed thereon, which must be especially made. On the other hand, some supplementary objects on caps have fixing elements to be fastened to caps. But then caps and supplementary objects are fixed together, allowing only for a single function. For various functions, various caps have to be prepared, which is inconvenient.

SUMMARY OF THE INVENTION

It is the main object of the present invention to provide a multi-purpose cap clip which allows to put various accessory objects on a brim of a cap.

Another object of the present invention is to provide a multi-purpose cap clip which has a simple structure and is inexpensive.

A further object of the present invention is to provide a multi-purpose cap clip which fits on a cap that is commonly available on the market, so that the Cap accommodates various accessory objects without modification.

The present invention can be more fully understood by reference to the following description and accompanying drawings.

DETAILED DESCRIPTION OF THE PREFERRED EMBODIMENTS

Figure 1:
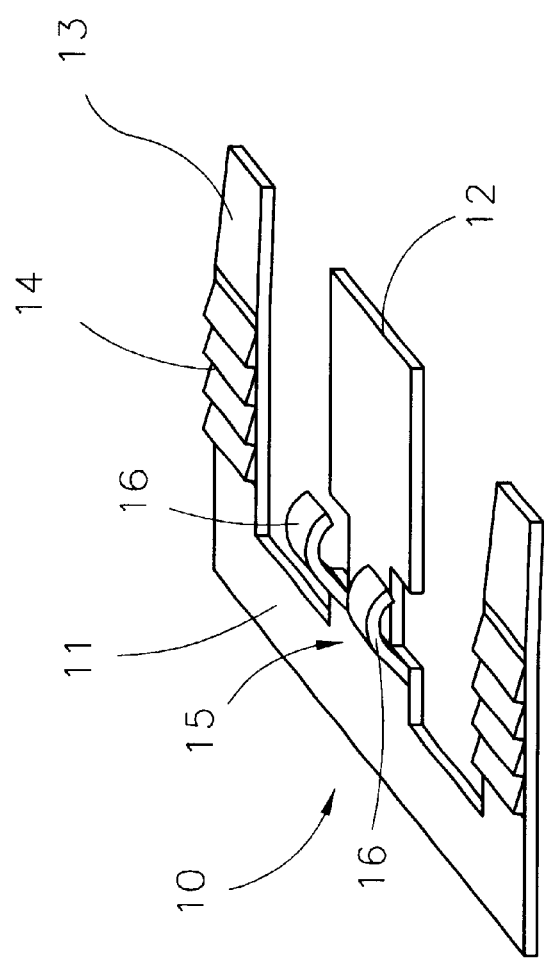
FIG. 1 is a perspective view of the multi-purpose cap clip of the present invention in the first embodiment.

As shown in FIG. 1, ,the multi-purpose cap clip of the present invention in a first embodiment has a clip unit 10 to be fastened to a brim 21 of a cap 20, as shown in FIGS. 3A–3D. The clip unit 10 comprises: a base plate 11, which is a rectangular plate; a fixing plate 12, extending away from the base plate 11 from a middle part thereof in a rearward direction; and two clasping plates 13, extending rearward from two ends of the base plate.11. The fixing plate 12, the base plate 11 and the two clasping plates 13 lie in a common plane or in different planes. As shown in FIGS. 3A–3D, the fixing plate 12 and the two clasping plates 13 of the clip unit 10 clasp upper and lower sides of the brim 21 of the cap 20. Since the fixing plate 12 and the two clasping plates 13 are elastic, the clip unit 10 is held tight on the brim 21. The present invention further has a holding device 15 for fastening an accessory object 30 on the. clip unit 10.

Referring again to FIG. 1, for keeping the clip unit 10 on the brim 21 with an increased holding force, the two clasping plates 13 have several teeth 14 on a surface thereof that contacts the brim 21. Thus holding friction between the two clasping plates 13 and the brim 21 is increased.

Figure 2A:
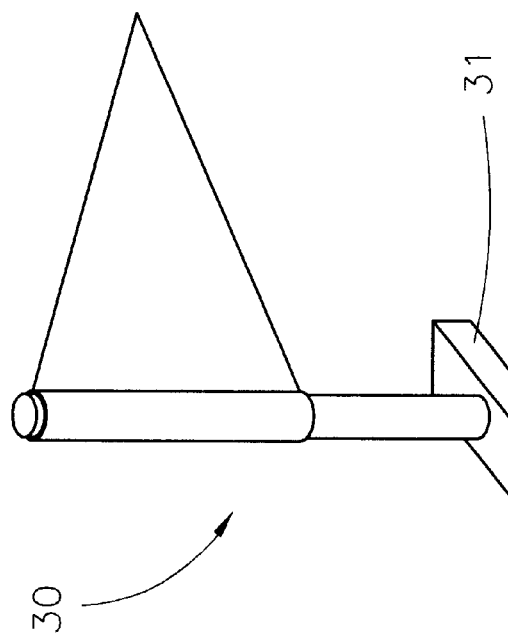
FIGS. 2A–2C are perspective views of various accessory objects held by the present invention in the first embodiment.
Figure 2C:
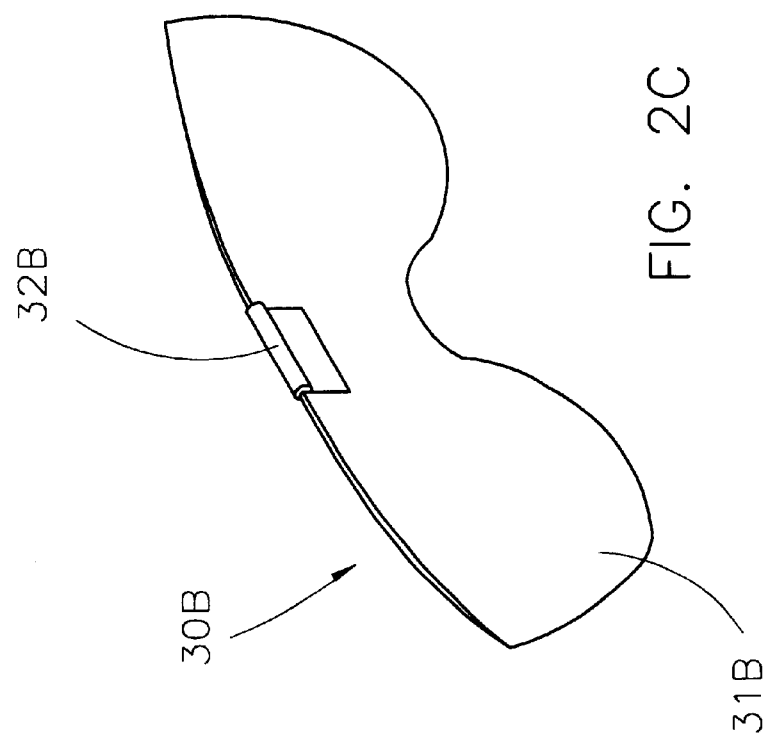
Figure 2B:
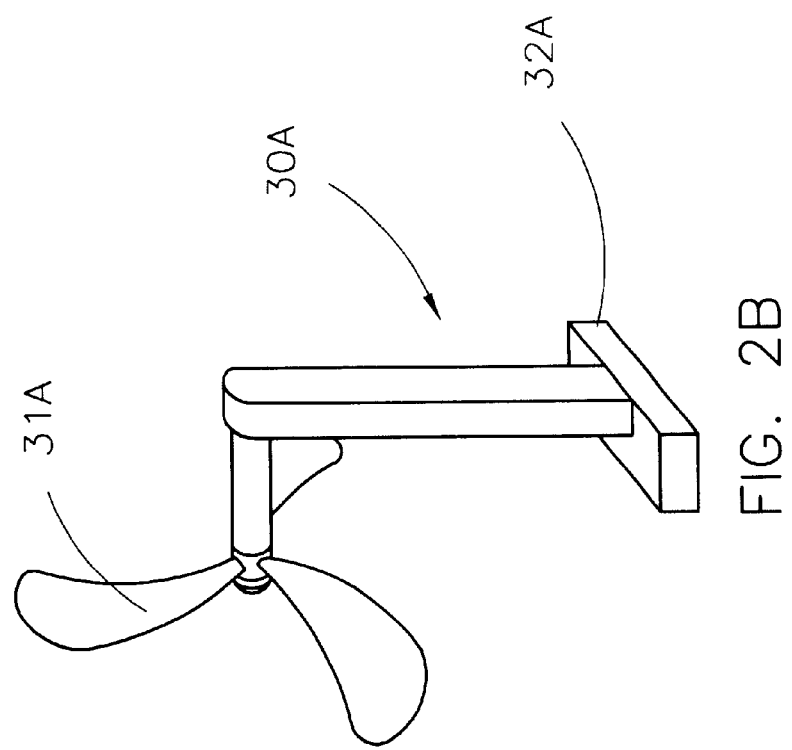

Referring to FIGS. 2A to 2C, the present invention is able to hold various accessory objects 30. As shown in FIG. 2A, the accessory object 30 is a flag with a lower end which is attached to a holding base 31. The holding base 31 is held by the holding device 15 of the clip unit 10. As shown in FIG. 1, in the first embodiment of the present invention, the holding unit 15 comprises two curved elastic plates 16, attached to the fixing plate 12 on an upper side thereof. A gap is left between the two elastic plates 16 and the fixing plate 12, forming the holding device 15 and allowing to insert the holding base 31. The holding base 31 of the accessory object 30 is formed like the inverted letter T and is easily inserted into the holding device 15, so that the accessory object 30 is mounted on the clip unit 10.

FIGS. 2B and 2C show further variations of accessory objects. As shown in FIG. 2B, an accessory object 30A is used which is a toy wind wheel 31A set on a holding base 32A. As shown in FIG. 2B, an accessory object 30B is used which is a pair of sunglasses 31B, to which a central holding element 32B is attached.

Figure 3C:
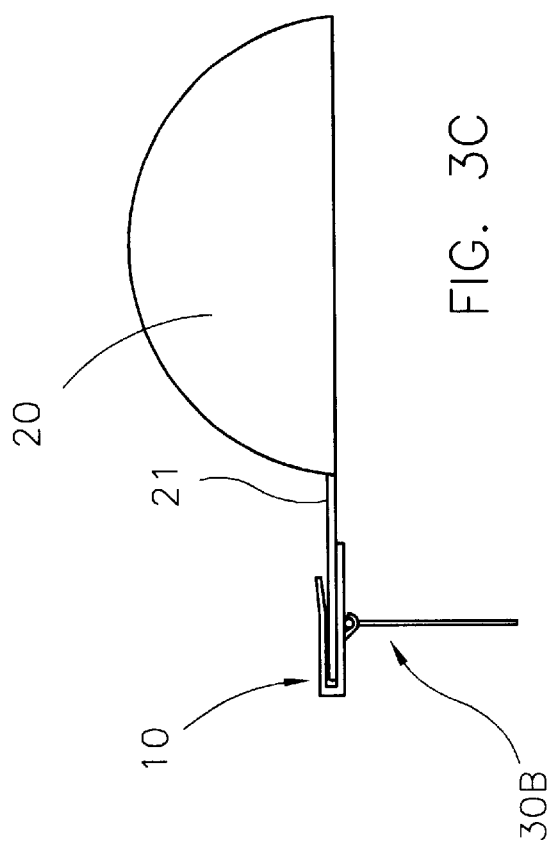
FIGS. 3A–3D are schematic illustrations of the present invention in the first embodiment used in conjunction with various accessory objects.
Figure 3D:
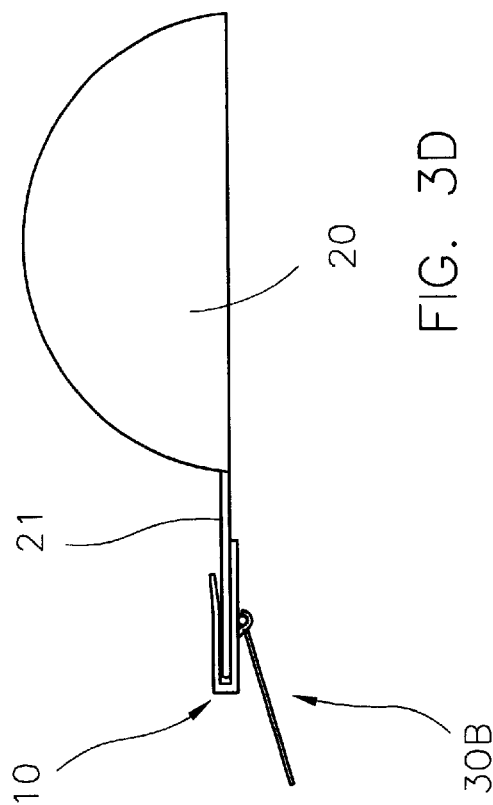
Figure 3A:
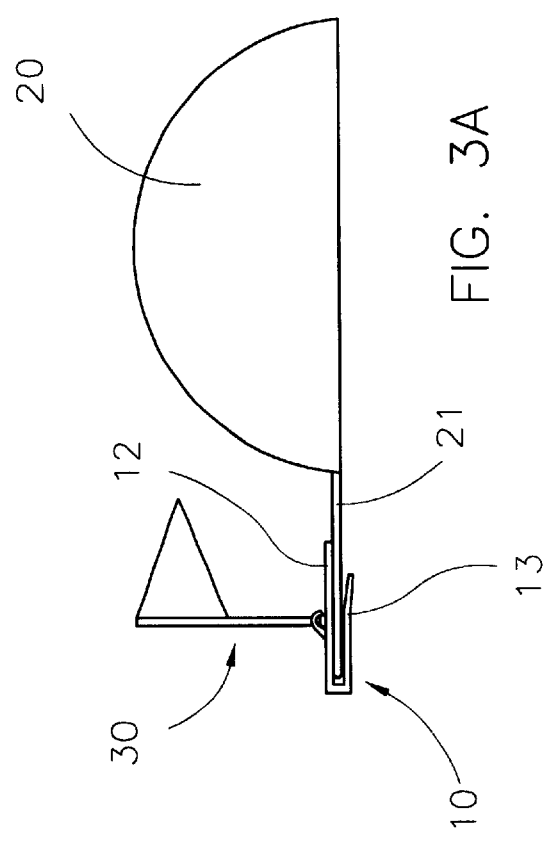
Figure 3B:
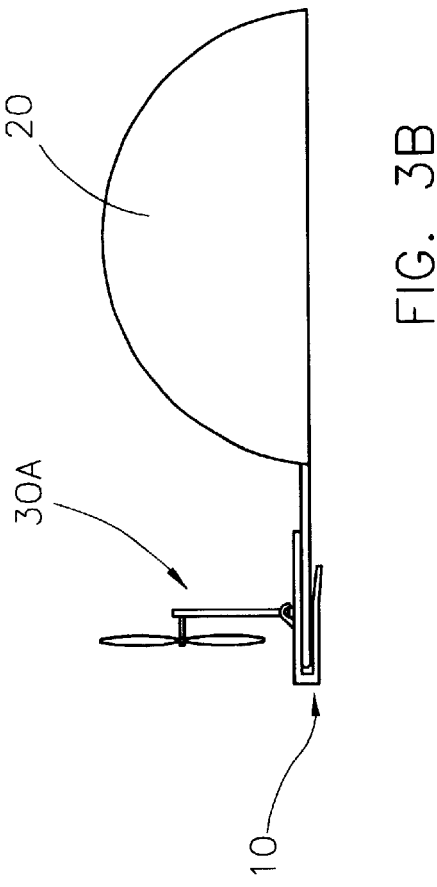

FIGS. 3A–3D show various ways of mounting the accessory object 30 on the clip unit 10. Depending on the kind of accessory object used, the holding device 15 is placed on the upper side or the lower side of the brim 21, then the accessory object is put on the holding device 15. As shown in FIGS. 3A and 3B, with the accessory object 30, 30A being a flag and a toy wind wheel, respectively, the holding device 15 is placed on the upper side of the brim 21. On the other hand, as shown in FIGS. 3C and 3D, with the accessory object 30B being a pair of sunglasses, the holding device 15 is placed on the lower side of the brim 21. Then the holding element 32B is inserted into the holding device 15, allowing to adjust a tilting angle of the sunglasses 31B.

Figure 1C:
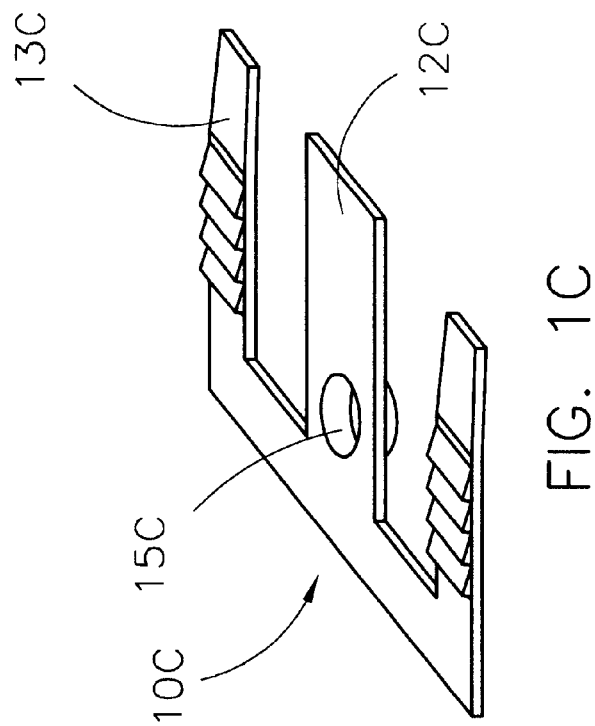
FIGS. 1A–1C are perspective views of variations of the fixing element of the present invention in the first embodiment.
Figure 1A:
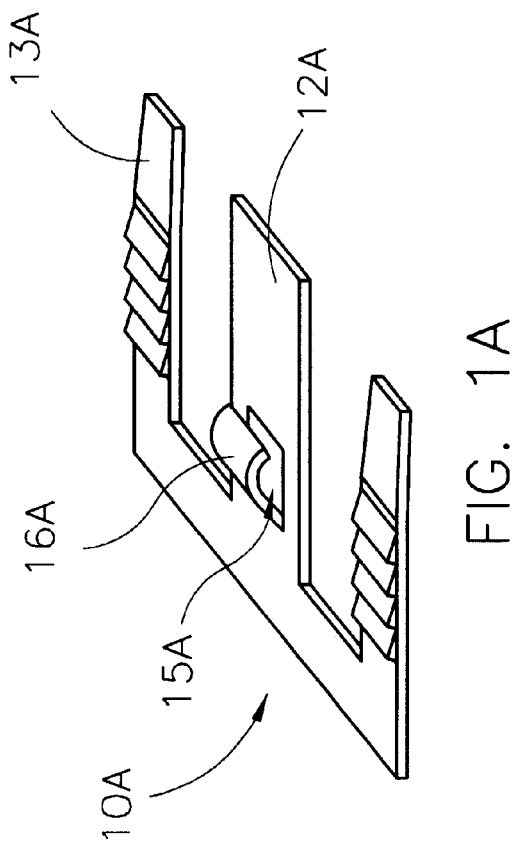
Figure 1B:
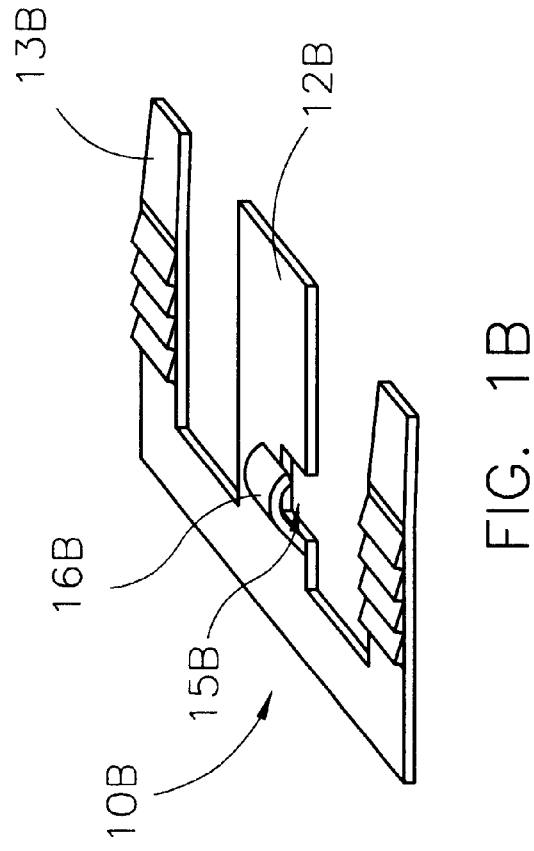

Referring to FIGS. 1A–1C, the holding device 15 has several variations. Therein, as shown in FIG. 1A, a holding device 15A is used which is a single curved elastic plate 16A, attached to a fixing plate 12A at a central position thereof. Alternatively, as shown in FIG. 1A, a holding device 15B is used which is a single curved elastic plate 16A, attached to a fixing plate 12B at an asymmetric lateral position thereof. Finally, as shown in FIG. 1C, a holding device 15C is used which is a circular hole in a fixing plate 12C.

The present invention allows a user to mount any of various accessory objects on the cap 20, serving multiple purposes. The same cap carries a flag, sunglasses or another object without any need of modification.

Figure 4:
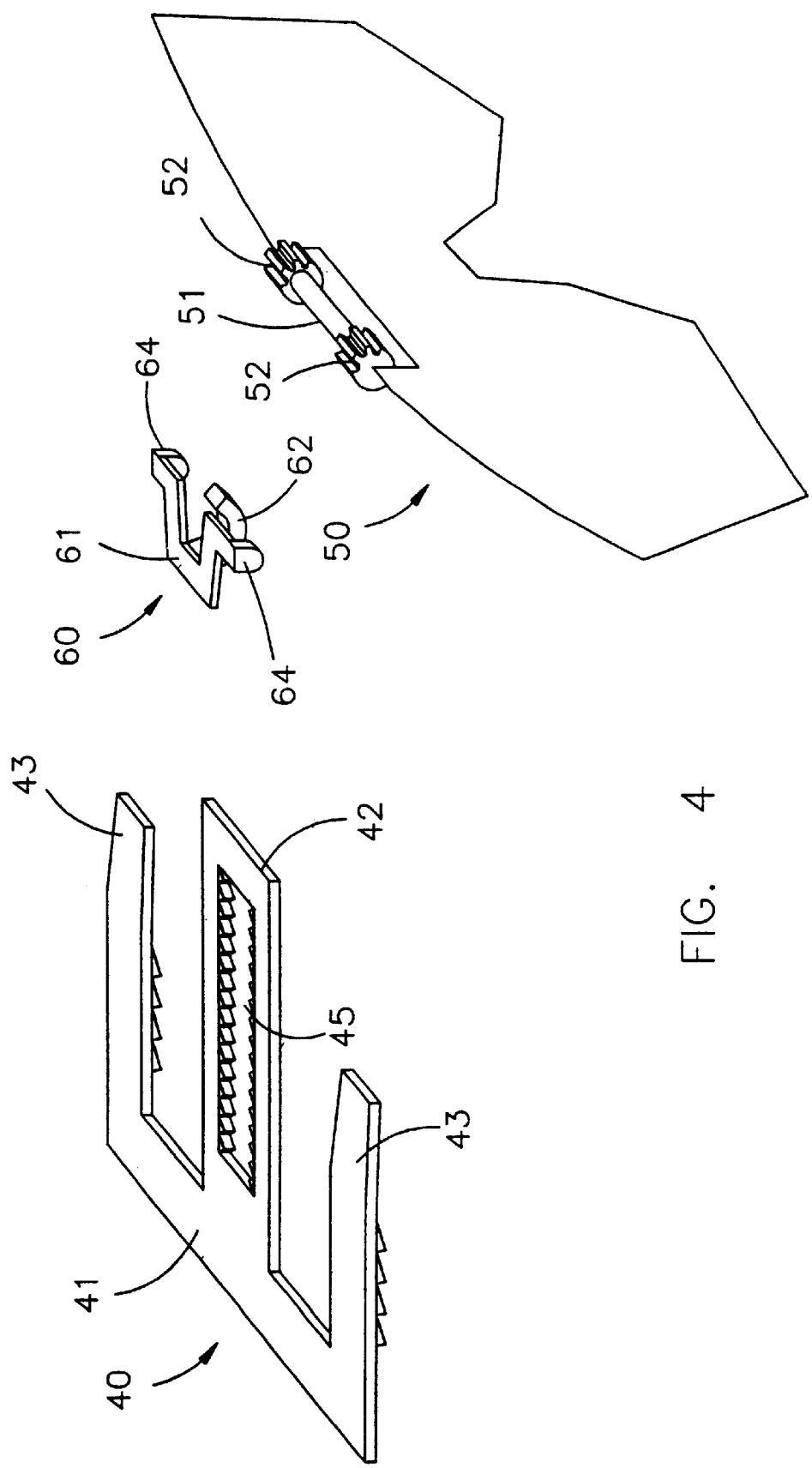
FIG. 4 is a perspective view of the multi-purpose cap clip of the present invention in the second embodiment.
Figure 5:
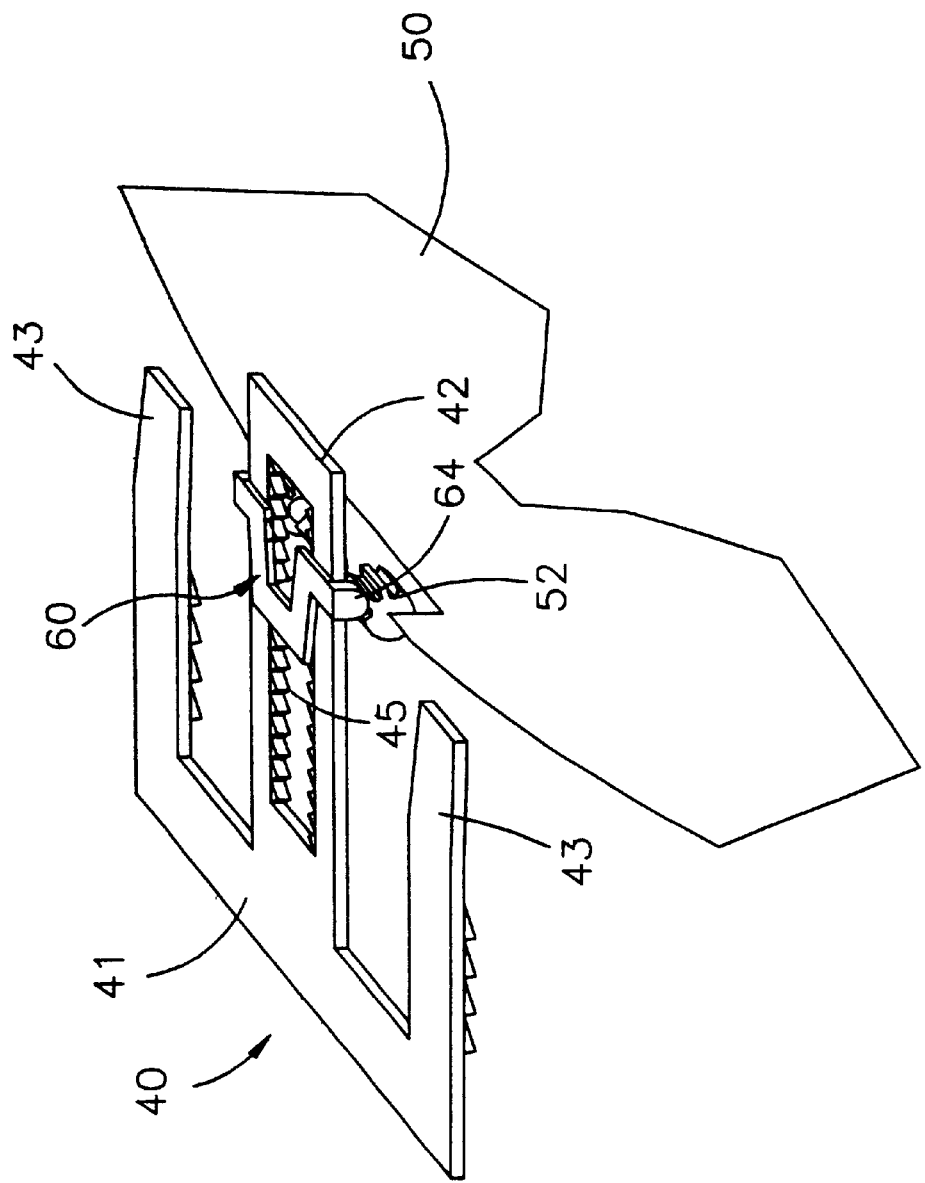
FIG. 5 is a perspective view of the present invention in the second embodiment, with an accessory object mounted thereon.

Referring now to FIGS. 4 and 5, the present invention in a second embodiment comprises a clip unit 40, a pair of sunglasses 50; and a movable seat 60. The clip unit 40 further comprises: a base plate 41, which is a rectangular plate; a fixing plate 42, extending away from the base plate 41 from a middle part thereof in a rearward direction; two clasping plates 43, extending rearward from two ends of the base plate 41 and, together with the fixing plate 42, clasping the brim 21 of the cap 20. The movable seat 60 is mounted on the fixing plate 42 and movable thereon, carrying the sunglasses 50, allowing to position the sunglasses 50 on the fixing plate 42.

The fixing plate has a central opening 45, taking in the movable seat 60. As shown in FIGS. 4 and 5, the movable seat 60 has a main body 61 with a lower side which carries an elastic hook 62. When the movable seat is mounted on the fixing plate 42, the elastic hook 62 reaches through the opening 45 to a location below the fixing plate 42. The sunglasses 50, at a top edge thereof in a central position, have a holding rod 51. The holding rod 51 is inserted in the elastic hook 62, so that the sunglasses 50 are held on the fixing plate 42.

For adjusting a tilting angle of the sunglasses 50, the main body 61 of the movable seat 60 on two ends thereof has positioning projections 64, and the two ends of the holding rod 51 each carry a cog 52. The positioning projections 64Sand the cogs 52 engage, holding the sunglasses 50 at a fixed tilting angle.

The present invention in the second embodiment serves to hold a pair of sunglasses on a cap. The main characteristic thereof is that the sunglasses 50 have an adjustable distance from the eyes of a user, adjusted by moving the movable seat 60 on the fixing plate 42. With the positioning projections 64 and the cogs 52 mutually engaging in various positions, the tilting angle of the sunglasses 50 is conveniently adjusted.

As the above explanation shows, the multi-purpose cap clip of the present invention has a simple structure and is inexpensive, allowing to mount any kind of accessory objects on a cap with a brim at low cost and in an economical way. The present invention is combinable with various accessory objects. Any manufacturer producing accessory objects for caps only needs to provide a holding element on each accessory object that fits into the holding device 15 of the clip unit 10, so as to connect the accessory object with the multi-purpose cap clip of the present invention. Thus caps serve multiple additional functions. Furthermore, the multi-purpose cap clip of the present invention is suitable for all caps without any need of modifications. Therefore, a manufacturer of accessory objects does not need to produce further, specialized caps.

While the invention has been described with reference to preferred embodiments thereof, it is to be understood that modifications or variations may be easily made without departing from the spirit of this invention which is defined by the appended claims.

What is claimed is:

1. A multi-purpose cap clip, comprising:

a clip unit having a fixing plate and two clasping plates extending from and generally perpendicular to a base plate, said clasping plates being positioned at sides of said fixing plate, such that said fixing plate and said clasping plates form a clasping mechanism to secure said clip unit at three contact areas to a brim of a cap, said fixing plate being positioned on a first side of a distal end of said brim of said cap, and said clasping plates being positioned on a second side of said distal end of said brim of said cap;

a holding device; and an accessory object having a holding element which engages said holding device and is secured in place thereby;

wherein after assembly, said clip unit fastens said accessory object to said distal end of said brim of said cap.

2. A multi-purpose cap clip according to claim 1, wherein:

at least one of said fixing plate and said two clasping plates of said clip unit comprise a plurality of teeth on a surface that contacts said brim of said cap to increase holding friction.

3. A multi-purpose cap clip according to claim 1, wherein:

said accessory object is a pair of sunglasses, and said holding device is mounted on a movable seat, said movable seat being movably mounted on said fixing plate, so that said pair of sunglasses is movable along said clip unit.

4. A multi-purpose cap clip according to claim 3, wherein:

at least one cog is attached to said pair of sunglasses and said movable seat has at least one projection that engages said at least one cog, providing a means to fix an angle of said pair of sunglasses. relative to said brim of said cap.

* * * * *